United States Patent
Mongeon

(10) Patent No.: US 7,965,420 B2
(45) Date of Patent: Jun. 21, 2011

(54) METHOD AND APPARATUS FOR IMAGE REGISTRATION FOR IMAGE PROCESSING

(75) Inventor: Michael C. Mongeon, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 639 days.

(21) Appl. No.: 12/059,170

(22) Filed: Mar. 31, 2008

(65) Prior Publication Data

US 2009/0244561 A1    Oct. 1, 2009

(51) Int. Cl.
*G06F 15/00* (2006.01)
*H04N 1/409* (2006.01)
*H04N 1/46* (2006.01)

(52) U.S. Cl. ......... 358/3.26; 358/1.9; 358/501; 358/504
(58) Field of Classification Search .................. 358/3.26, 358/1.9, 504, 501, 498; 347/19, 116, 117; 399/15, 301, 49, 72, 394, 395, 396, 405
See application file for complete search history.

(56) References Cited

U.S. PATENT DOCUMENTS 6,198,549 B1 *   3/2001   Decker et al. ................. 358/504

* cited by examiner

*Primary Examiner* — Charlotte M Baker
(74) *Attorney, Agent, or Firm* — Ronald E. Prass, Jr.; Prass LLP

(57) ABSTRACT

A method and apparatus that evaluates an image registration for image processing is disclosed. The method may include outputting one or more test patterns to a user, receiving misregistration level input parameters from the user, calculating misregistration using the misregistration level input parameters from the user by adding a first edge of a page perceptibility threshold and a second edge of the page perceptibility threshold and dividing the result of the addition by two, determining if the calculated misregistration is acceptable, wherein if the calculated misregistration is not acceptable, making corrections to the image registration, otherwise using the image registration for image processing based on the calculated misregistration.

20 Claims, 4 Drawing Sheets

METHOD AND APPARATUS FOR IMAGE REGISTRATION FOR IMAGE PROCESSING

BACKGROUND

Disclosed herein are a method and apparatus for image registration for image processing, as well as corresponding apparatus and computer-readable medium.

Image show-through is the magnitude of misregistration of "side 2" relative to the "side 1" image when a two-sided image is projected through paper. Conventional methods of the evaluation of image show-through involve holding a print sample up to the light to visually evaluate registration of show through image relative to front-side image. This technique is good enough to determine if the system is out of register, but doesn't quantify the misregistration into physical terms.

SUMMARY

A method and apparatus that evaluates an image registration for image processing is disclosed. The method may include outputting one or more test patterns to a user, receiving misregistration level input parameters from the user, calculating misregistration using the misregistration level input parameters from the user by adding a first edge of a page perceptibility threshold and a second edge of the page perceptibility threshold and dividing the result of the addition by two, determining if the calculated misregistration is acceptable, wherein if the calculated misregistration is not acceptable, making corrections to the image registration, otherwise using the image registration for image processing based on the calculated misregistration.

DETAILED DESCRIPTION

Figure 1:
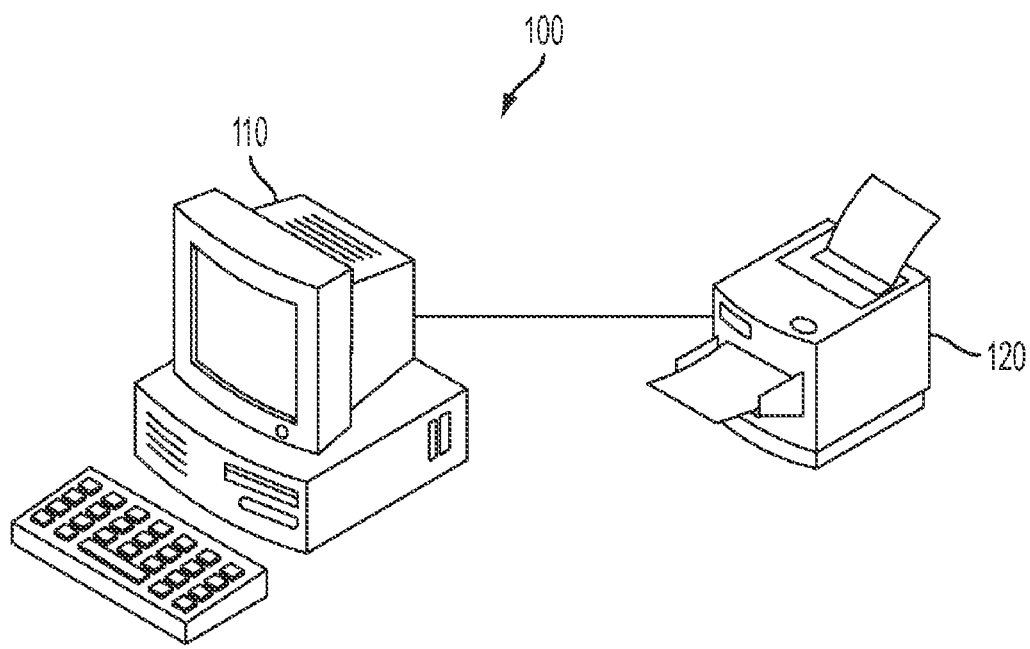
FIG. 1 illustrates an exemplary diagram of an image processing system in accordance with one possible embodiment of the disclosure.

Aspects of the embodiments disclosed herein relate to a method for image registration for image processing, and corresponding apparatus and computer readable medium. The disclosed embodiments may concern a process to improve the estimation of show-through misregistration using the human visual system. This process may include using a test pattern that may include a series of isolated lines equally spaced on side 1 of a page, and with variable levels of misregistration on side 2 of the page. The levels of misregistration may be indicated by a scale (such as −10 to 10, for example), with increments between (such as 100 microns each, for example).

At level zero, side 1 to side 2 registration may be zero, for example. The observer may hold the sample up to the light and visually scan the line series along the numeric scale observing how the show-through visibility comes in and out of register. The observer may record their perceived show-through for the left edge, and then the right edge. The average of these observations may provide an estimate of misregistration at that location/orientation on the page according to the example formula:

$$\text{MISREG ESTIMATE} = (E1 + E2)/2$$

where
$E1$ = left (or top) edge perceptibility threshold
$E2$ = right (or bottom) edge perceptibility threshold.

The claimed advantages of this method is (1) accurate estimation of side to side misregistraion and (2) 3× reduction of observer to observer show-through measurement error by the averaging of two show-through estimates (left edge+right edge, for example).

Furthermore, the proposed method is advantageous over current methods because: (1) An observer who rates show-through "loosely" will do so for both left and right edge (or top and bottom) show-through estimations, resulting in a similar average misregistration estimate as an observer who rates show-through "tightly". (2) This technique is less sensitive to observer visual acuity than single edge estimates. (3) Since the scale is built into the target, no ruler or eye loupe is necessary in making this measurement. (4) Measurement is insensitive to stroke width.

The disclosed embodiments may include a method for evaluating an image registration for image processing that may include outputting one or more test patterns to a user, receiving misregistration level input parameters from the user, calculating misregistration using the misregistration level input parameters from the user by adding a first edge of a page perceptibility threshold and a second edge of the page perceptibility threshold and dividing the result of the addition by two, determining if the calculated misregistration is acceptable, wherein if the calculated misregistration is not acceptable, making corrections to the image registration, otherwise using the image registration for image processing based on the calculated misregistration.

The disclosed embodiments further include an apparatus that may evaluate an image registration for image processing that may include a user interface, and an image registration unit that outputs one or more test patterns to a user, receives misregistration level input parameters from the user through the user interface, calculates the misregistration using the misregistration level input parameters from the user by adding a first edge of a page perceptibility threshold and a second edge of the page perceptibility threshold and dividing the result of the addition by two, and determines if the calculated misregistration is acceptable, wherein if the calculated misregistration is not acceptable, the image registration unit makes corrections to the image registration, otherwise the image registration unit uses the image registration for image processing based on the calculated misregistration.

The disclosed embodiments further include a computer-readable medium that stores instructions for controlling a computing device for evaluating an image registration for image processing. The instructions may include outputting one or more test patterns to a user, receiving misregistration level input parameters from the user, calculating misregistration using the misregistration level input parameters from the user by adding a first edge of a page perceptibility threshold and a second edge of the page perceptibility threshold and dividing the result of the addition by two, determining if the calculated misregistration is acceptable, wherein if the calculated misregistration is not acceptable, making corrections to the image registration, otherwise using the image registration for image processing based on the calculated misregistration.

FIG. 1 illustrates an exemplary diagram of an image processing system 100 in accordance with one possible embodiment of the disclosure. The image processing system 100 may include an image processing device 110 and an output device 120 (or image output device). The image processing device 110 may be a personal computer, a portable computer, a personal digital assistant, or a server, for example. The output device 120 may be a printer, a facsimile (fax) device, or a multi-function device (MFD), for example.

Figure 2:
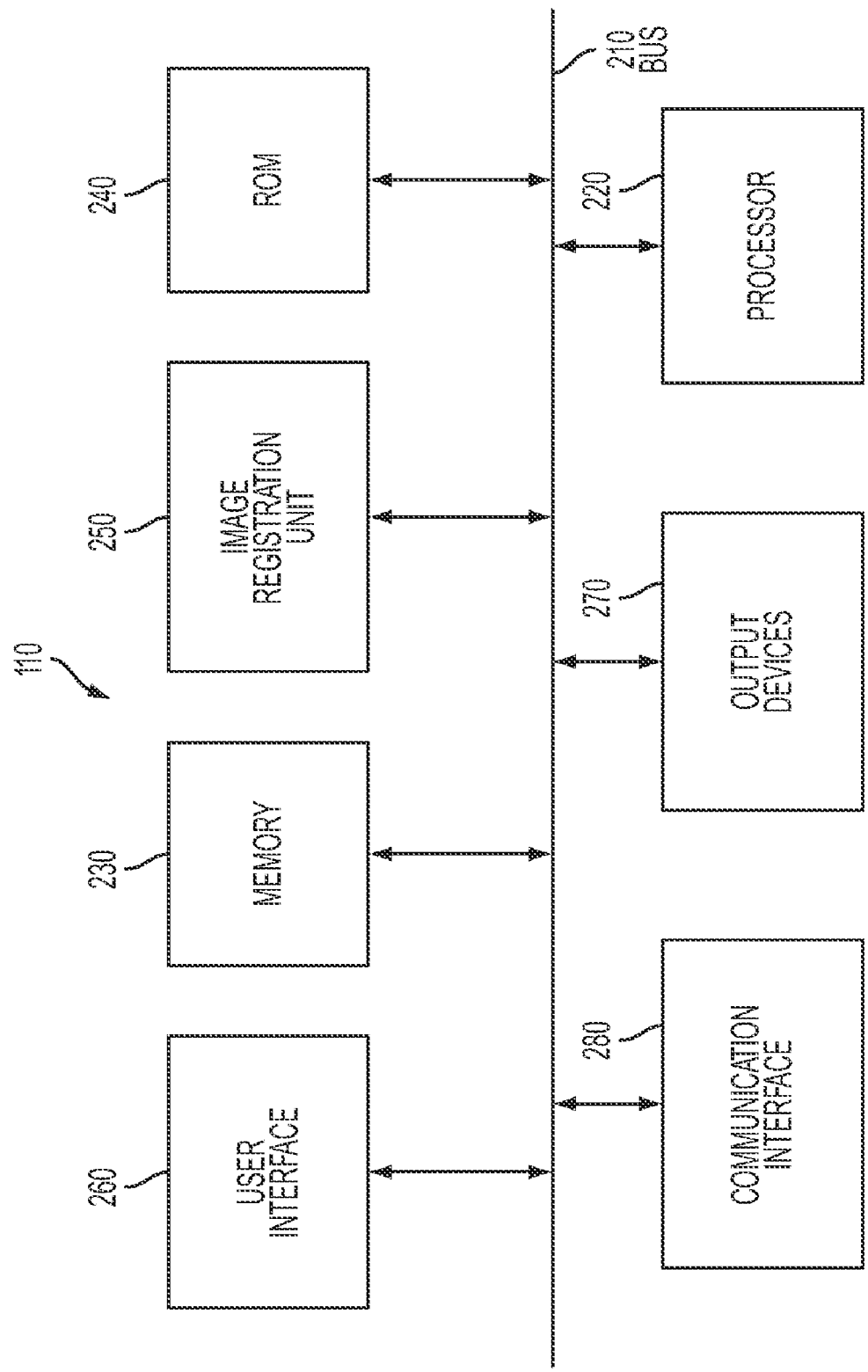
FIG. 2 illustrates a block diagram of an exemplary image processing device in accordance with one possible embodiment of the disclosure.

FIG. 2 illustrates a block diagram of an exemplary image processing device 110 in accordance with one possible embodiment of the disclosure. The image processing device 110 may include may include a bus 210, a processor 220, a memory 230, a read only memory RO 240, an image registration unit 250, a user interface 260, an output device 270, and a communication interface 280. Bus 210 may permit communication among the components of the image processing device 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User Interface 260 may include one or more conventional mechanisms that permit a user to communicate with the image processing device 110 and input information, such as a keyboard, a mouse, a pen, a voice recognition device, touchpad, buttons, etc. Output device 270 may include one or more conventional mechanisms that output information to the user, including a display, a printer, a copier, a scanner, a multi-function device, one or more speakers, or a medium, such as a memory, or a magnetic or optical disk and a corresponding disk drive.

The image processing device 110 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image processing device 110 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the image processing device 110, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Figure 3:
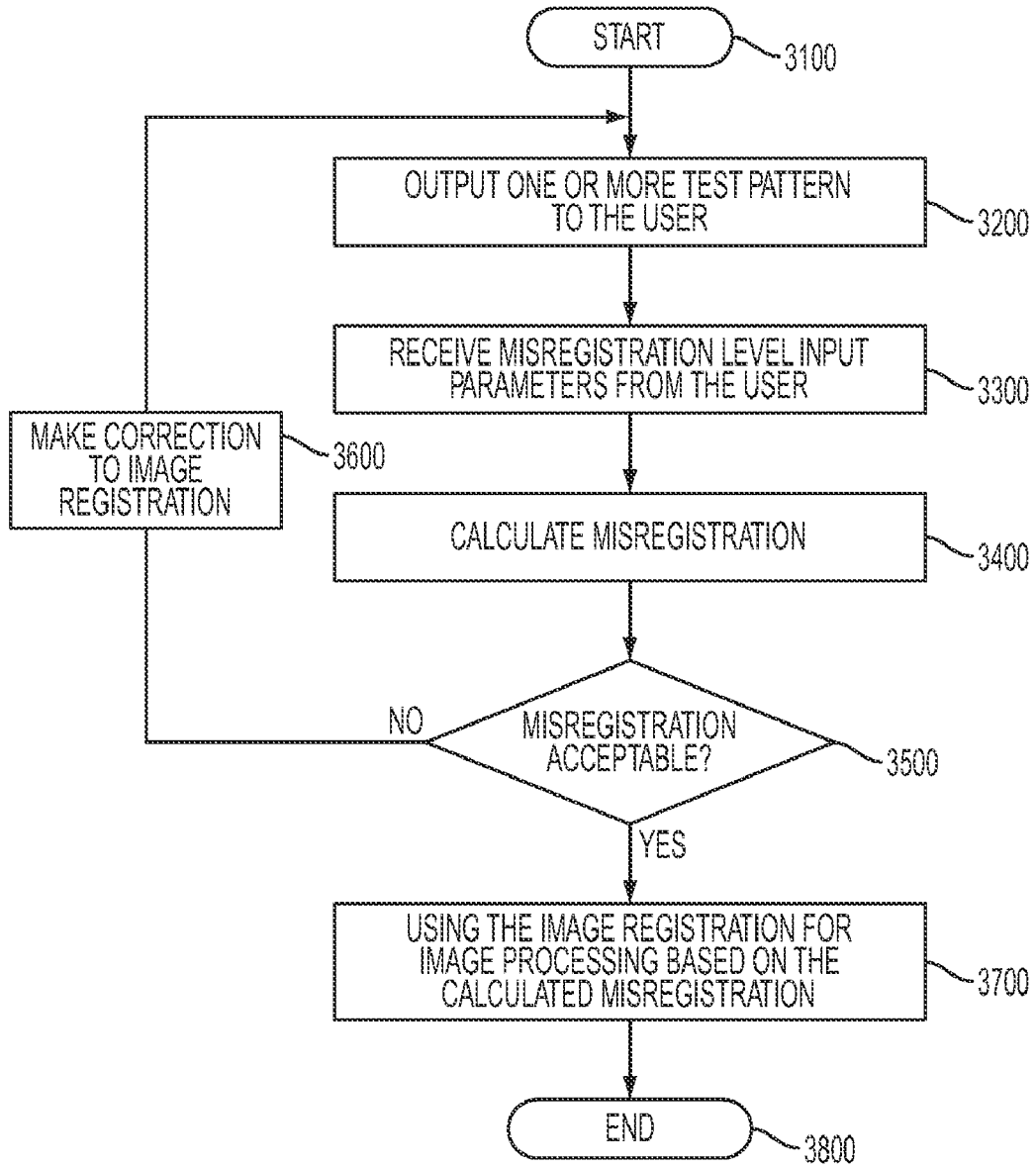
FIG. 3 is a flowchart of an image registration process in accordance with one possible embodiment of the disclosure.

For illustrative purposes, the operation of the image processing device 110, and in particular, the image registration unit 250 and the image registration process are described in FIG. 3 in relation to the block diagrams shown in FIGS. 1 and 2.

FIG. 3 is a flowchart of an image registration process in accordance with one possible embodiment of the disclosure. The method begins at 3100, and continues to 3200, where the image registration unit 250 may output one or more test patterns to the user. The test patterns output may be based on the running of diagnostic tests. For example, the image registration unit 250 may receive a signal to run one or more diagnostic tests. The signal may be received automatically or from a user through the user interface 260, for example. The image registration unit 250 may run the diagnostic tests and the test patterns output may be based on the diagnostic tests run.

Figure 4:
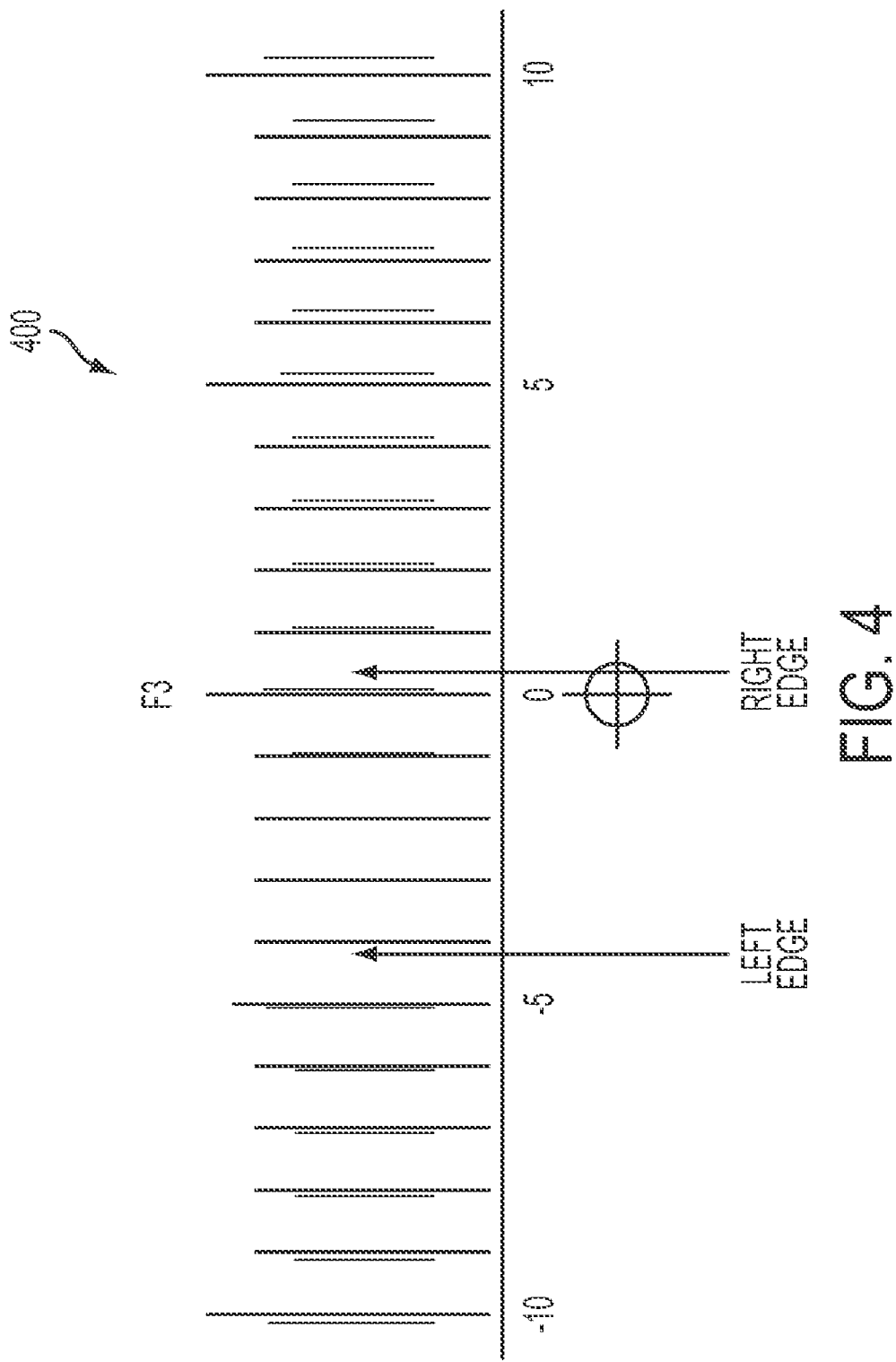
FIG. 4 is an exemplary test pattern in accordance with one possible embodiment of the disclosure.

FIG. 4 is an exemplary test pattern in accordance with one possible embodiment of the disclosure. The exemplary test pattern may include a series of isolated lines equally spaced on side 1, and with variable levels of misregistration on side 2. The level of misregistration may be indicated by the scale [−10,10], for example, with increments of 100 microns, for example. At level zero, side 1 to side 2 registration should be zero, for example. The observer may hold the sample up to the light and visually scan the line series along the numeric scale, from "−10 to 10", observing how the show-through visibility comes in and out of register. The observer may record their perceived show-through for the left (or top) edge, and then the right (or bottom) edge. Another "vernier" style test pattern may be used to evaluate side 1 side 2 misregistration. The test pattern may include side 1 having equally spaced lines while side 2 may include lines of known misregistration. Thus, the test pattern in FIG. 4 would be designed, for example, so that the range [−10,10] corresponds to [−1,1] mm of misregistration. When viewing the sample, the user would hold the print up to the light and exam from side 1 and the registration will come in and out of register. Without this test pattern, the user would only be able to evaluate the current state of the machine using 1 edge (i.e., constant misregistration).

At step 3300, the image registration unit 250 may receive misregistration level input parameters from the user through the user interface 260. The misregistration level input parameters may be input as numeric values, for example. At step 3400, the image registration unit 250 may calculate the misregistration using the misregistration level input parameters from the user by adding a first edge of a page perceptibility threshold and a second edge of the page perceptibility threshold and dividing the result of the addition by two. The first edge may be the left edge and the second edge may a right edge of a page, for example. Alternatively, the first edge may be the top edge and the second edge may be the bottom edge of a page, for example.

At step 3500, the image registration unit 250 may determine if the calculated misregistration is acceptable. If the misregistration is acceptable, at step 3700, the image registration unit 250 may use the image registration based on the calculated misregistration. The process then goes to step 3800 and ends.

If at step 3500, the image registration unit 250 determines that the calculated misregistration is not acceptable, at step 3600, the image registration unit 250 may make corrections to the image registration. The process then returns to step 3200, for example. The process may reiterate until the calculated image misregistration is acceptable. The process may then go to step 3800, and end.

Note that while the above process is shown to be performed using an image processing device such as a computer, the process may be performed directly using the user interface of a printer, fax machine, or multifunction device, for example. Furthermore, the process make be implemented as part of a device driver or image device software, for example. The process may be added to an image processing system or image output device through installation of new drivers or software, or through a software or driver update, for example.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of evaluating an image registration for image processing, comprising:
    outputting one or more test patterns to a user;
    receiving misregistration level input parameters from the user;
    calculating misregistration using the misregistration level input parameters from the user by adding a first edge of a page perceptibility threshold and a second edge of the page perceptibility threshold and dividing the result of the addition by two;
    determining if the calculated misregistration is acceptable; wherein if the calculated misregistration is not acceptable,
    making corrections to the image registration, otherwise using the image registration for image processing based on the calculated misregistration.

2. The method of claim 1, wherein the first edge is a left edge and the second edge is a right edge of a page.

3. The method of claim 1, wherein the first edge is a top edge and the second edge is a bottom edge of a page.

4. The method of claim 1, wherein the image is processed by at least one of a printer, a multifunction device, and a facsimile machine.

5. The method of claim 1, further comprising:
    receiving a signal to run diagnostic tests, the signal being received by one of automatically and from a user through the user interface; and
    running the diagnostic tests based on the received signal, wherein the test patterns are output based on the diagnostics tests run.

6. The method of claim 1, wherein after the image registration corrections are made, further comprising:
    receiving misregistration level input parameters from the user based on the corrected image registration;
    calculating misregistration using the misregistration level input parameters from the user by adding a first edge of a page perceptibility threshold and a second edge of the page perceptibility threshold and dividing the result of the addition by two;
    determining if the calculated misregistration is acceptable; wherein if the calculated misregistration is not acceptable,
    making corrections to the image registration, otherwise using an image registration for image processing based on the calculated misregistration.

7. The method of claim 1, wherein the method is performed using at least one of a device driver and image device software.

8. An apparatus that evaluates an image registration for image processing, comprising:
    a user interface; and
    an image registration unit that outputs one or more test patterns to a user, receives misregistration level input parameters from the user through the user interface, calculates the misregistration using the misregistration level input parameters from the user by adding a first edge of a page perceptibility threshold and a second edge of the page perceptibility threshold and dividing the result of the addition by two, and determines if the calculated misregistration is acceptable, wherein if the calculated misregistration is not acceptable, the image registration unit makes corrections to the image registration, otherwise the image registration unit uses the image registration for image processing based on the calculated misregistration.

9. The apparatus of claim 8, wherein the first edge is a left edge and the second edge is a right edge of a page.

10. The apparatus of claim 8, wherein the first edge is a top edge and the second edge is a bottom edge of a page.

11. The apparatus of claim 8, wherein the image is processed by at least one of a printer, a multifunction device, and a facsimile machine.

12. The apparatus of claim 8, wherein the image registration unit receives a signal to run diagnostic tests, the signal being received by one of automatically and from a user through the user interface, and runs the requested diagnostic tests, and wherein the test patterns are output based on the diagnostics tests run.

13. The apparatus of claim 8, wherein after the image registration unit corrects the image registration, the image registration unit receives misregistration level input parameters from the user based on the corrected image registration, calculates misregistration using the misregistration level input parameters from the user by adding a first edge of a page perceptibility threshold and a second edge of the page perceptibility threshold and dividing the result of the addition by two, determines if the calculated misregistration is acceptable; wherein if the calculated misregistration is not acceptable, the image registration unit makes corrections to the image registration, otherwise the image registration unit uses an image registration for image processing based on the calculated misregistration.

14. The apparatus of claim 8, wherein the image registration unit performs image registration using at least one of a device driver and image device software.

15. A non-transitory computer-readable medium storing instructions for controlling a computing device for evaluating an image registration for image processing, the instructions comprising:
   outputting one or more test patterns to a user;
   receiving misregistration level input parameters from the user;
   calculating misregistration using the misregistration level input parameters from the user by adding a first edge of a page perceptibility threshold and a second edge of the page perceptibility threshold and dividing the result of the addition by two;
   determining if the calculated misregistration is acceptable; wherein if the calculated misregistration is not acceptable,
   making corrections to the image registration, otherwise using the image registration for image processing based on the calculated misregistration.

16. The non-transitory computer-readable medium of claim 15, wherein the first edge is a left edge and the second edge is a right edge of a page.

17. The non-transitory computer-readable medium of claim 15, wherein the first edge is a top edge and the second edge is a bottom edge of a page.

18. The non-transitory computer-readable medium of claim 15, wherein the image is processed by at least one of a printer, a multifunction device, and a facsimile machine.

19. The non-transitory computer-readable medium of claim 15, the instructions further comprising:
   receiving a signal to run diagnostic tests, the signal being received by one of automatically and from a user through the user interface; and
   running the diagnostic tests based on the received signal, wherein the test patterns are output based on the diagnostics tests run.

20. The non-transitory computer-readable medium of claim 15, wherein after corrections to the image registration are made, the instructions further comprise:
   receiving misregistration level input parameters from the user based on the corrected image registration;
   calculating misregistration using the misregistration level input parameters from the user by adding a first edge of a page perceptibility threshold and a second edge of the page perceptibility threshold and dividing the result of the addition by two;
   determining if the calculated misregistration is acceptable; wherein if the calculated misregistration is not acceptable,
   making corrections to the image registration, otherwise using an image registration for image processing based on the calculated misregistration.

\* \* \* \* \*